US011361885B2

(12) United States Patent
Marsh et al.

(10) Patent No.: US 11,361,885 B2
(45) Date of Patent: Jun. 14, 2022

(54) METHOD AND COMPOSITION FOR MOISTURE INGRESS PROTECTION, AND ELECTRONIC DEVICE COMPRISING SAME

(71) Applicant: NURVV LIMITED, Twickenham (GB)

(72) Inventors: Derek Marsh, Horley (GB); Wei Tu, Richmond (GB)

(73) Assignee: NURVV LIMITED, Twickenham (GB)

( * ) Notice: Subject to any disclaimer, the term of this patent is extended or adjusted under 35 U.S.C. 154(b) by 0 days.

(21) Appl. No.: 17/144,649

(22) Filed: Jan. 8, 2021

(65) Prior Publication Data

US 2021/0217543 A1    Jul. 15, 2021

Related U.S. Application Data

(60) Provisional application No. 62/958,898, filed on Jan. 9, 2020.

(51) Int. Cl.
*H01C 1/00*    (2006.01)
*G01L 1/20*    (2006.01)
(Continued)

(52) U.S. Cl.
CPC ................ *H01C 1/00* (2013.01); *G01L 1/20* (2013.01); *H01C 10/10* (2013.01); *H01C 17/00* (2013.01)

(58) Field of Classification Search
CPC .......... H01C 1/00; H01C 10/10; H01C 17/00; G01L 1/20
See application file for complete search history.

(56) References Cited

U.S. PATENT DOCUMENTS 3,383,912 A * 5/1968 Leggett, Jr. ............... G01L 1/16
                                                        73/862.68
3,885,097 A * 5/1975 Pobgee ................... G06F 3/045
                                                        178/18.05
(Continued)

FOREIGN PATENT DOCUMENTS

JP        H06-53681 A      2/1994
JP        4961482 B2       6/2012

OTHER PUBLICATIONS

European Patent Office, International Search Report and Written Opinion issued in corresponding Application No. PCT/IB2021/050136 dated Apr. 30, 2021.

*Primary Examiner* — Kyung S Lee
(74) *Attorney, Agent, or Firm* — Stites & Harbison, PLLC; Jeffrey A. Haeberlin; Gary N. Stewart

(57) ABSTRACT

A method includes coating at least one conductive element of an electronic device with an electrically non-conductive thixotropic liquid. An electronic device includes a first layer including an upper conductive element, a second layer including a lower conductive element, and a spacer positioned between the layers. The first layer, the second layer, and the spacer define a sensing chamber in which the upper and lower conductive elements move to vary the resistance of the electronic device. A non-conductive thixotropic liquid is present within the sensing chamber. Movement of the layers toward each other displaces the thixotropic liquid from an initial state coating at least one of the conductive elements to permit contact between the conductive elements, and movement of the first layer and the second layer away from each other returns the thixotropic liquid to the initial state.

21 Claims, 6 Drawing Sheets

(51) Int. Cl.
  *H01C 10/10* (2006.01)
  *H01C 17/00* (2006.01)

(56) References Cited

U.S. PATENT DOCUMENTS

| | | | |
|---|---|---|---|
| 3,959,585 A | | 5/1976 | Mattes et al. |
| 4,790,968 A | * | 12/1988 | Ohkawa ............... H01C 10/106 |
| | | | 200/264 |
| 10,379,654 B2 | * | 8/2019 | Li ............................. G01L 1/18 |
| 2004/0000195 A1 | | 1/2004 | Yanai et al. |
| 2007/0084293 A1 | * | 4/2007 | Kaiserman ............. B60N 2/002 |
| | | | 73/763 |
| 2014/0144251 A1 | | 5/2014 | Steier |
| 2015/0320356 A1 | * | 11/2015 | Toth ..................... A61H 9/0078 |
| | | | 600/587 |
| 2018/0145244 A1 | * | 5/2018 | Otagiri ................ H01L 41/1132 |
| 2018/0356303 A1 | * | 12/2018 | Li ........................... G01L 1/146 |
| 2019/0000177 A1 | | 1/2019 | Dervish et al. |

* cited by examiner

METHOD AND COMPOSITION FOR MOISTURE INGRESS PROTECTION, AND ELECTRONIC DEVICE COMPRISING SAME

CROSS-REFERENCE TO RELATED APPLICATIONS

This application claims the benefit of U.S. Provisional Patent Application No. 62/958,898, filed Jan. 9, 2020, the entire disclosure of which is hereby incorporated by reference.

BACKGROUND OF THE INVENTION

The present invention relates to the field of moisture ingress protection for electronic devices. In particular, the present invention relates to a method for reducing moisture-based damage or interference in an electronic device, and an electronic device, which use a thixotropic liquid to prevent sensor degradation, interference, or failure.

Some electronics, such as force-sensitive resistors whose functionality is tied to two electrically conductive elements moving in and out of contact with each other within a sensing chamber, must displace air during operation to maintain pressure equilibrium and ensure proper operation of the device. In this regard, force-sensitive resistors generally include a vent through which air can travel out of and into the sensing chamber as the force-sensitive resistor compresses and decompresses, respectively. Problematically, though, the vent facilitating the inflow and outflow of air also acts as a potential point of ingress for moisture. As such, moisture initially present outside of the sensing chamber and proximate to the vent can be drawn into sensing chamber as the force-sensitive resistor decompresses and air travels through the vent into the sensing chamber. Moisture within the sensing chamber can cause a short circuit or degrade one or both conductive elements of the force-sensitive resistor, which, in turn, may temporarily or permanently damage the device. Moisture within the sensing chamber of the force-sensitive resistor can also undesirably affect the resistance of the device, which can cause the device to operate erratically and/or produce inaccurate readings. It is thus common for force-sensitive resistors frequently subjected to wet or high-humidity conditions, such as force-sensitive resistors implemented in the sole or insoles of running shoes, to malfunction or stop working altogether due to moisture ingress.

Conventionally, to protect electronic devices from moisture ingress, a liquid compound is applied to cover the whole of a target area or structure within the electronic device intended to be protected. The applied liquid compound is then cured/cross-linked to form a solid barrier which effectively encapsulates the target area or structure within the electronic. Such means of protection is, however, generally unsuitable for force-sensitive resistors as the solid barrier formed by the cured/cross-linked compound can impede contact between the two conductive elements or the inflow and outflow of air into and out of the sensing chamber. Such means of protection also presents other disadvantages which are not exclusive to force-sensitive resistors. For instance, once the liquid compound is cured/cross-linked, it is generally difficult to subsequently manipulate. As such, the encapsulated area or structure of the electronic device generally cannot be accessed (e.g., to modify or connect additional or alternative components). The solid barrier created by such conventional encapsulation process can also adversely affect heat dissipation, which, in turn, can damage or otherwise negatively impact the performance of the device.

BRIEF SUMMARY OF THE INVENTION

In accordance with one aspect of the invention, a method for reducing moisture-based damage or interference within an electronic device includes coating at least one conductive element of the electronic device with an electrically non-conductive thixotropic liquid.

In some embodiments, the thixotropic liquid includes a thixotropic liquid exhibiting a viscosity ranging from about 140 cP to about 1800 cP at 40° C.

In other embodiments, coating at least one conductive element of the electronic device includes coating the thixotropic liquid to exhibit a thickness ranging from about 10 nm to about 500 µm.

In yet other embodiments, coating at least one conductive element of the electronic device includes coating the thixotropic liquid to exhibit a thickness ranging from about 100 nm to about 10 µm.

In still yet other embodiments, coating at least one conductive element of the electronic device includes coating only a single conductive element of the electronic device with thixotropic liquid.

In other embodiments, coating at least one conductive element of the electronic device includes coating two opposing conductive elements of the electronic device with thixotropic liquid.

In other embodiments, coating of the at least one conductive element of the electronic device is performed via screen printing.

Further still, in other embodiments, coating of the at least one conductive element of the electronic device is performed via inkjet printing.

In yet other embodiments, coating of the at least one conductive element of the electronic device is performed via vapor deposition.

According to another aspect of the invention, an electronic device, such as a force-sensitive resistor with improved resistance to moisture-based damage or interference, includes a first layer including an upper conductive element, a second layer including a lower conductive element facing the upper conductive element, and a spacer that is positioned between the first layer and the second layer. The first layer, the second layer, and the spacer collectively define a sensing chamber in which the upper conductive element and the lower conductive element can be moved toward or away from each other to vary the resistance, and thus conductivity, of the electronic device. The electronic device further includes a non-conductive thixotropic liquid within the sensing chamber. In use, movement of the first layer and the second layer of the electronic device toward each other displaces the thixotropic liquid from an initial state coating at least one of the upper conductive element and the lower conductive element, and movement of the first layer and the second layer away from each other returns the thixotropic liquid to the initial state coating the conductive element(s). In this way, the thixotropic liquid thus provides a protective layer against moisture ingress while still enabling the electronic device to function normally.

In some embodiments, the electronic device includes a thixotropic liquid, which in some embodiments, may exhibit a viscosity ranging from about 140 cP (centipoise) to about 1800 cP at 40° C. In some embodiments, the thixotropic liquid exhibits a thickness ranging from about 10 nm to about 500 µm when in the initial (i.e., non-displaced) state.

The electronic device may further include a vent which places the sensing chamber in fluid communication with a channel defined by the first layer and the second layer to enable the electronic device to maintain pressure equilibrium while transitioning between a compressed and non-compressed configuration. In some embodiments, the lower conductive element is defined by a first electrode and a second electrode, which are spaced apart from each other to form an open circuit that can be completed by the upper conductive element when a compressive force is applied to the electronic device. In some embodiments, the upper conductive element is comprised of a force-sensing ink.

In some embodiments, the volume of thixotropic liquid within the sensing chamber is sufficient to coat both the upper conductive element and the lower conductive element. To reduce the opportunity for air, and thus any moisture carried therewith, to enter the sensing chamber, the entire volume defined by the sensing chamber may be filled with thixotropic liquid in some embodiments. In such embodiments, at least a portion of thixotropic liquid is initially expelled from the sensing chamber into the channel to permit the upper conductive element and the lower conductive element to move toward each other as a compressive force is applied and then subsequently return into the sensing chamber from the channel as the compressive force is removed.

In some embodiments, the thixotropic liquid within the sensing chamber only coats the lower conductive element and prevents any moisture entering the sensing chamber from contacting the lower conductive element and creating a short circuit. As only the lower conductive element is coated in such embodiments, the thixotropic liquid can be displaced at a faster rate than embodiments in which both the upper and lower conductive elements are coated, thereby enabling the electronic device to provide faster response times. In such embodiments, the thixotropic liquid may remain within the sensing chamber when displaced.

BRIEF DESCRIPTION OF THE SEVERAL VIEWS OF THE DRAWINGS

These and other features, aspects, and advantages of the present invention will become better understood with regard to the following description, appended claims, and accompanying drawings where:

DETAILED DESCRIPTION OF EXEMPLARY EMBODIMENTS OF THE INVENTION

Figure 1:
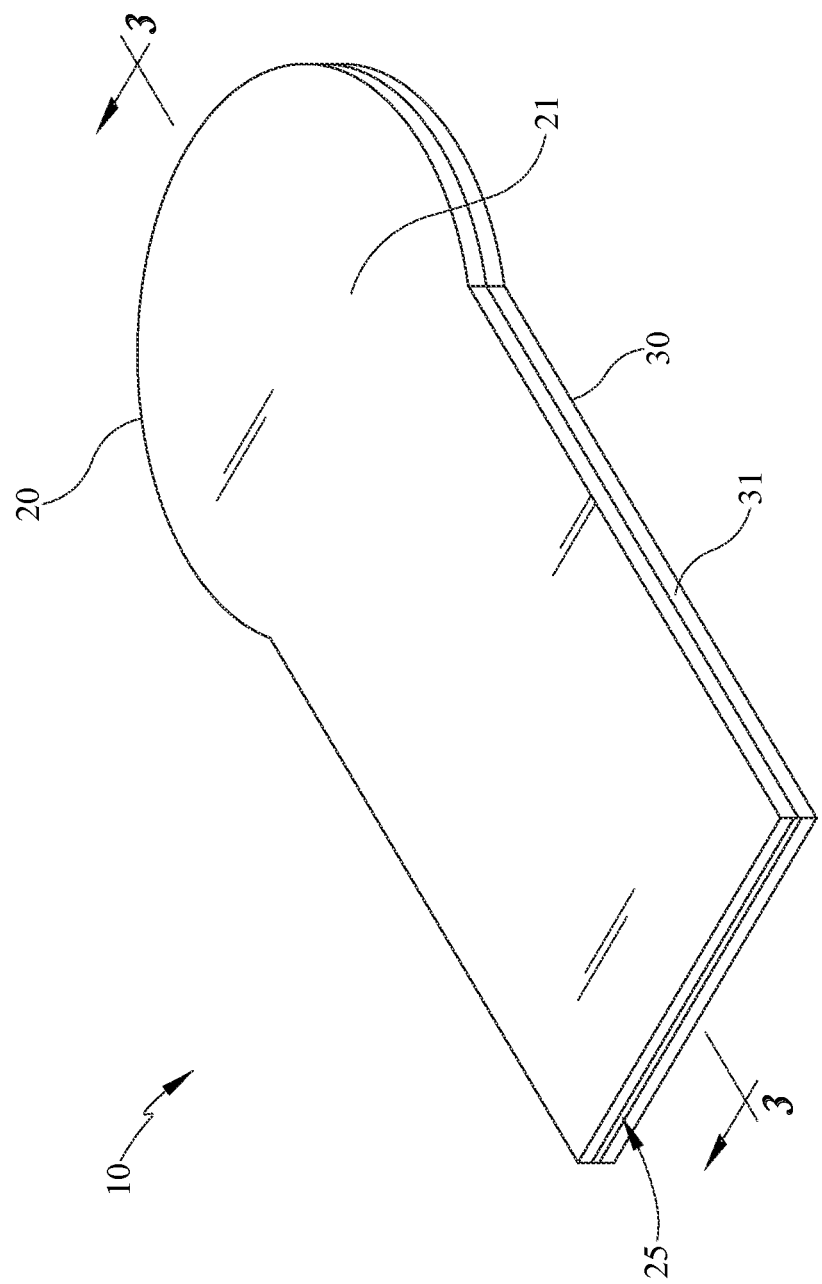
FIG. 1 is a perspective view of an exemplary force-sensitive resistor made in accordance with the present invention.

The details of one or more embodiments of the presently-disclosed subject matter are set forth below. Modifications to embodiments described below, and other embodiments, will be evident to those of ordinary skill in the art after a study of the present disclosure. The specific details of the described exemplary embodiments are provided primarily for clearness of understanding and no unnecessary limitations are to be understood therefrom. In case of conflict, the specification of this document, including definitions, will control.

While the terms used herein are believed to be well understood by one of ordinary skill in the art, definitions are set forth herein to facilitate explanation of the presently-disclosed subject matter.

Unless defined otherwise, all technical and scientific terms used herein have the same meaning as commonly understood by one of ordinary skill in the art to which the presently-disclosed subject matter belongs. Although any methods, devices, and materials similar or equivalent to those described herein can be used in the practice or testing of the presently-disclosed subject matter, representative methods, devices, and materials are now described.

Following long-standing patent law convention, the terms "a," "an," and "the" refer to "one or more" when used in this application, including the claims.

As used herein, ranges can be expressed as from "about" one particular value, and/or to "about" another particular value. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

The terms "comprising," "including," and "having" are intended to be inclusive and mean that there may be additional elements other than the listed elements.

As used herein, the term "thixotropic liquid" is understood to mean a non-Newtonian liquid whose viscosity decreases when stress, such as a compressive force, is imposed on it. For example, in some embodiments, the thixotropic liquid may comprise a liquid whose viscosity decreases with increased stress, such as shear-thinning liquids, while, in other embodiments, the thixotropic liquid may comprise a liquid whose viscosity decreases as the duration of stress applied increases.

FIGS. 1-4 show various views of an exemplary force-sensitive resistor 10 (i.e., an electronic device) made in accordance with the present invention. As shown in FIGS. 1-4, the force-sensitive resistor 10 includes a first layer 20 including an upper conductive element 22, a second layer 30 including a lower conductive element 32 that faces the upper conductive element 22, and a spacer 40 that is positioned between the first layer 20 and the second layer 30. As shown best in FIGS. 3 and 4, the first layer 20, the second layer 30, and the spacer 40 collectively define a sensing chamber 15 in which the upper conductive element 22 and the lower conductive element 32 can be moved toward or away from each other.

When a compressive force, F, is applied to the first layer 20 and/or the second layer 30, the upper conductive element 22 is moved toward, and ultimately into contact with, the lower conductive element 32, thereby decreasing resistance and increasing the conductivity of the force-sensitive resistor 10. As the compressive force, F, imposed on the force-sensitive resistor 10 is further increased and a greater portion of the upper conductive element 22 is placed in contact with the lower conductive element 32, the resistance of the force-sensitive resistor 10 is further decreased while the conductivity is further increased. Conversely, when the compressive force, F, is removed, the first layer 20 and the second layer 30, and thus the upper conductive element 22 and the lower conductive element 32, move away from each other, thus increasing the resistance and decreasing the conductivity of the force-sensitive resistor 10. In this way, the force-sensitive resistor 10 can thus be transitioned between a compressed configuration (FIG. 4), in which a compressive force, F, is applied to move the upper conductive element 22 and the lower conductive element 32 toward each other, and a non-compressed configuration (FIGS. 1 and 3), in which no compressive force is applied.

Referring still to FIGS. 1-4, the force-sensitive resistor 10 further includes an electrically non-conductive thixotropic liquid 50 within the sensing chamber 15, which, due to its viscosity characteristics, can be displaced from an initial state coating at least one of the conductive elements 22, 32 (FIG. 3) to permit contact between the upper conductive element 22 and the lower conductive element 32 (FIG. 4) as the force-sensitive resistor 10 is transitioned from the non-compressed configuration to the compressed configuration. In this exemplary embodiment, only the lower conductive element 32 is coated by the thixotropic liquid 50 when the thixotropic liquid 50 is in the initial state. Of course, in other embodiments, the thixotropic liquid 50 may coat both the upper conductive element 22 and the lower conductive element 32 when in the initial state, as further described below with reference to FIGS. 5 and 6. As the force-sensitive resistor 10 transitions from the compressed configuration back to the non-compressed configuration, the thixotropic liquid 50 returns to the initial state coating the lower conductive element 32, thereby preventing any moisture drawn into the sensing chamber 15 from contacting the lower conductive element 32. In this way, the thixotropic liquid 50 thus provides a protective layer against moisture ingress while still enabling the force-sensitive resistor 10 to function normally. A more detailed account of this exemplary embodiment of the force-sensitive resistor 10 and its respective components and functionality is provided below.

Figure 2:
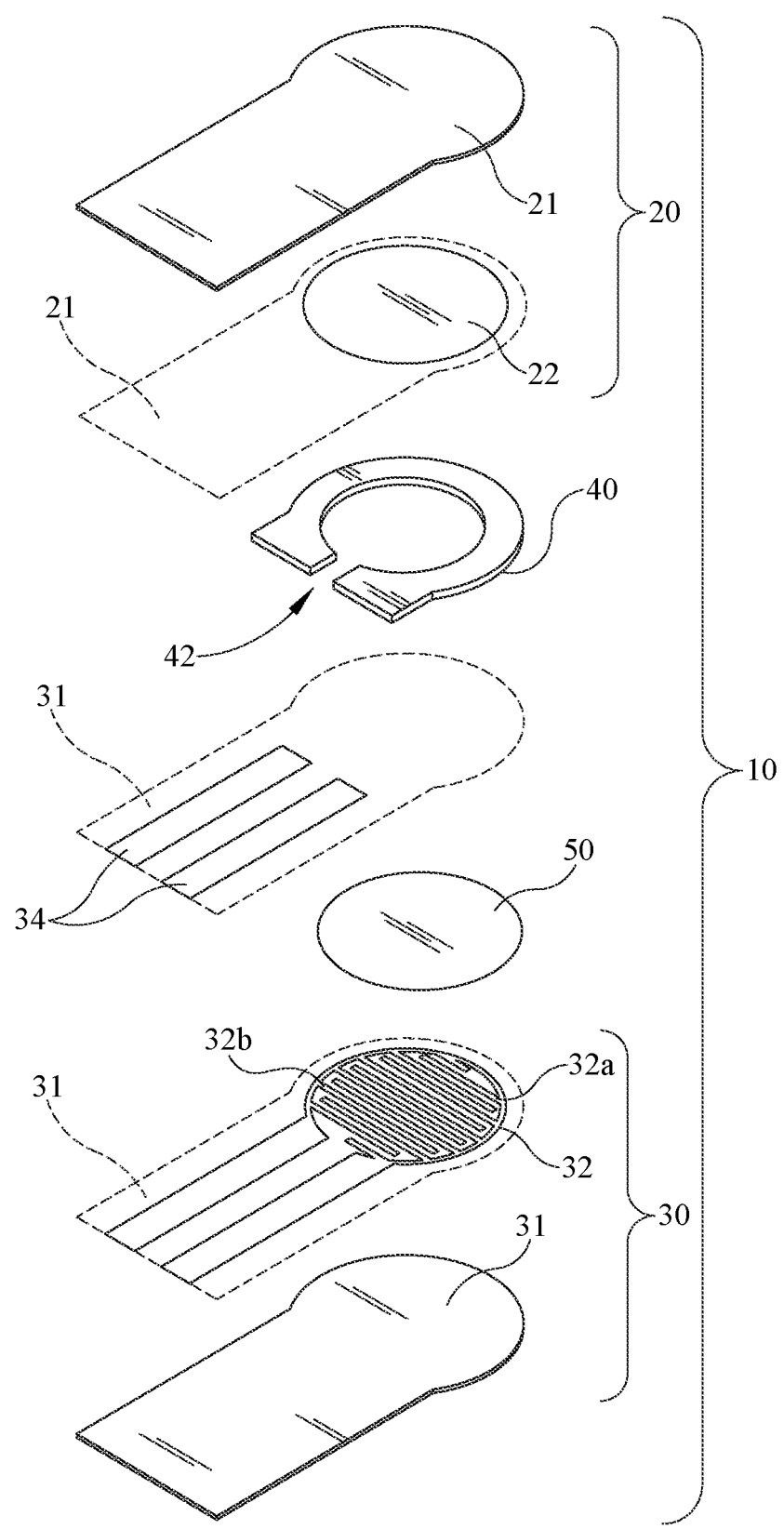
FIG. 2 is an exploded view of the exemplary force-sensitive resistor of FIG. 1.
Figure 3:
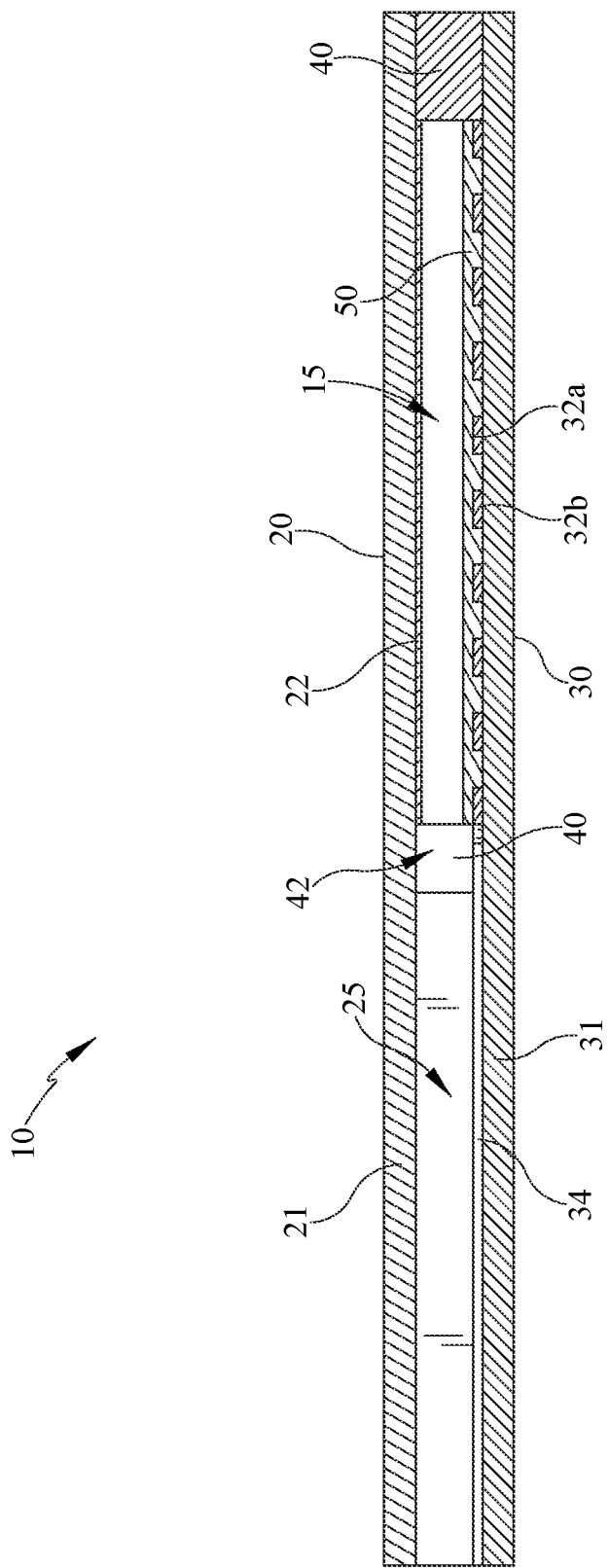
FIG. 3 is a sectional view of the exemplary force-sensitive resistor of FIG. 1 taken along line 3-3.

Referring still to FIGS. 1-4, the first layer 20 is defined by (and thus can be characterized as including) the upper conductive element 22 and a first substrate 21 on which the upper conductive element 22 is deposited. Similarly, the second layer 30 is defined by (and thus can be characterized as including) the lower conductive element 32 and a second substrate 31 on which the lower conductive element 32 is deposited. In FIG. 2, additional representations of the first substrate 21 and the second substrate 31 are provided in dashed lines to further clarify the arrangement of the respective elements of the force-sensitive resistor 10. In this exemplary embodiment, the first substrate 21 and the second substrate 31 are each comprised of a resilient flexible polymer film, such that both the first substrate 21 and the second substrate 31 can be temporarily deformed by a compressive force, F, before returning to a non-deformed configuration (FIG. 3). In this regard, the first layer 20, the second layer 30, or both can be manipulated to move the upper conductive element 22 and the lower conductive element 32 toward each other in this embodiment to affect the resistance of the force-sensitive resistor 10. Of course, it is appreciated that, in alternative embodiments, only one of the first substrate 21 and the second substrate 31 may be of flexible construction and still fall within the spirit and scope of the present invention.

Figure 4:
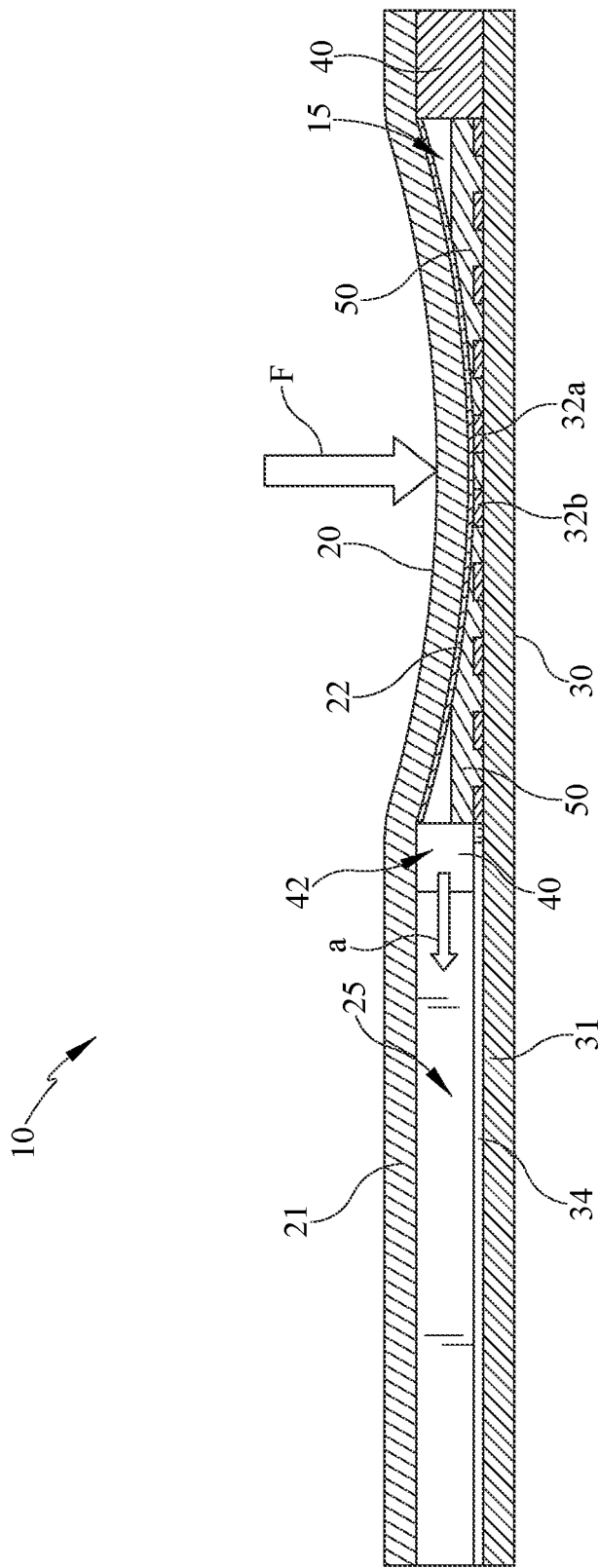
FIG. 4 is another sectional view of the exemplary force-sensitive resistor similar to FIG. 3, but with a compressive force applied and the force-sensitive resistor in a compressed configuration.

Referring now to FIGS. 2-4, in this exemplary embodiment, the upper conductive element 22 is comprised of a conductive force-sensing ink, such as a functional carbon-based ink, which is deposited on an interior surface of the first substrate 21 (i.e., the surface of the first substrate 21 facing the sensing chamber 15). Specifically, the conductive force-sensing ink forming the upper conductive element 22 is deposited on the first substrate 21 as to form a continuous body of ink, which, in this case, retains a substantially circular shape. In this embodiment, the lower conductive element 32 is defined by a conductive first electrode 32a and a conductive second electrode 32b, such as silver electrodes or copper electrodes, that are printed on an interior surface (i.e., the surface of the second substrate 31 facing the sensing chamber 15) of the second substrate 31 and spaced apart from each other.

Referring still to FIGS. 2-4, the first electrode 32a and the second electrode 32b, in this embodiment, are each semi-circular and include prongs, with the prongs of the first electrode 32a and the second electrode 32b arranged in alternating rows. The first electrode 32a and the second electrode 32b thus form an open circuit, which can be completed by the force-sensing ink of the upper conductive element 22 bridging the gap between the first electrode 32a and the second electrode 32b when a compressive force, F, is applied to the force-sensitive resistor 10, as best shown in FIG. 4. In this regard, as the compressive force, F, is increased, the force-sensing ink of the upper conductive element 22 further interconnects the first electrode 32a and the second electrode 32b of the lower conductive element 32, thereby further decreasing the resistance and increasing the conductivity of the force-sensitive resistor 10. As shown in FIG. 1, in this embodiment, the periphery of the first substrate 21 and the second substrate 31 are secured together (e.g., via adhesives) to maintain the upper conductive element 22 and the lower conductive element 32 opposite of each other. One of skill in the art will readily appreciate, however, that the upper conductive element 22 and/or the lower conductive element 32 may be comprised of alternative conductive materials or be alternatively arranged while still enabling the force-sensitive resistor 10 to function as intended.

Referring now to FIGS. 3 and 4, as the first electrode 32a and the second electrode 32b define an open circuit, the lower conductive element 32 is particularly susceptible to creating a short circuit in the event moisture enters into the sensing chamber 15. It is thus generally preferred that at least the lower conductive element 32 be coated with the thixotropic liquid 50 when the force-sensitive resistor 10 is in the non-compressed configuration and the thixotropic liquid 50 is in the initial state. To prevent the thixotropic liquid 50 itself from forming a conductive path between the first electrode 32a and the second electrode 32b and creating a short circuit, the thixotropic liquid 50 is necessarily non-conductive. Preferably, when the thixotropic liquid 50 is in the initial state (FIG. 3) the thixotropic liquid 50 coats the entirety of the exposed surfaces of the lower conductive element 32 and exhibits a thickness ranging from about 10 nm to about 500 μm, and more preferably from about 100 nm to about 10 μm, to prevent moisture deposit on the lower conductive element 32. However, the precise thickness of the thixotropic liquid 50 on the lower conductive element 32 may vary depending on the intended application and moisture content of the environment in which the force-sensitive resistor is implemented. For instance, if the force-sensitive resistor 10 is intended for use in high-humidity climates or wetter environments, the thickness of the thixotropic liquid 50 may be greater than that if the force-sensitive resistor 10 were intended for use in low-humidity or drier environments. As evidenced by viewing FIGS. 3 and 4 in sequence, as a compressive force, F, is applied to the first layer 20 and/or the second layer 30, air, a, is expelled from the sensing chamber 15 to permit the upper conductive element 22 and the lower conductive element 32 to move toward each other. As the upper conductive element 22 and the lower conductive element 32 move toward each other, a stress is applied to the thixotropic liquid 50. Due to the viscosity characteristics of the thixotropic liquid 50, the applied stress causes the viscosity of the thixotropic liquid 50 to decrease. As a result of the decreasing viscosity, the thixotropic liquid 50 is more amenable to displacement, which permits the upper conductive element 22 to contact the lower conductive element 32 in response to the compressive force, F, and complete the open circuit formed by the first electrode 32a and the second electrode 32b. In this exemplary embodiment, the volume of thixotropic liquid 50 within the sensing chamber 15 is such that the thixotropic liquid 50 remains in the sensing chamber 15 when displaced. As the compressive force, F, is removed from the force-sensitive resistor 10 the resiliency of the first substrate 21 and/or the second substrate 31 causes the force-sensitive resistor 10 to return to the non-compressed configuration, thereby drawing air, a, back into the sensing chamber 15. As a result of the compressive force, F, being removed, the stress applied to the thixotropic liquid 50 is also removed, which causes the thixotropic liquid 50 to return to its initial (non-displaced) state coating and protecting the lower conductive element 32.

Referring again to FIGS. 1-4, as only the lower conductive element 32 is coated in this exemplary embodiment, the thixotropic liquid 50 can be displaced at a faster rate than embodiments in which both the upper conductive element 22 and the lower conductive element 32 are coated (FIGS. 5 and 6), and thus generally provide faster response times. Accordingly, the force-sensitive resistor 10 in this embodiment may prove particularly useful in applications where the force-sensitive resistor 100 will be subjected to frequent iterations of transitioning between the compressed and non-compressed configuration, or rapid or minimal resistance change detection is particularly important.

Referring still to FIGS. 1-4, the thixotropic liquid 50 includes a mixture based on a non-Newtonian or more particularly thixotropic liquid and one or more additives in sufficient amount to provide required characteristics. The mixture based on a non-Newtonian or more particularly thixotropic liquid should include, but is not limited to, paraffinic, naphthenic, aromatic oils with non-ring long-chained structure, or staturated ring structure, or non-saturated ring structure. These should also include, but are not limited to, polyalphaolefins (PAO), polyglycols (PAG), ester oils (POE), silicone based fluids, soybean oils, castor oils, cotton seed oils, rapeseed oils, or triglycerine derived stearic acid and saturated fatty acid etc. The boiling point for the above typically ranges from less than 150° C. to beyond 540° C. The one or more additives include, but are not limited to: (1) rust inhibitors or water repellent, which including organic acids, alkaline compounds, esters, amino-acid derivatives, etc; (2) friction modifiers, including boron nitride, PTFE and other perfluoro derivatives and compounds, graphite, graphene, molybdenum disulfide, tungsten disulfide etc.; (3) anti-foaming agent based on powders (silica, cement, detergent etc.), oils (mineral oil, vegetable oil etc.), silicone compound, polyethylene glycol and polypropylene glycol copolymers as oils, alkyl polyacrylates etc; (4) dispersant with long chain hydrocarbons succinimides, such as polyisobutylene succinimides; (5) viscosity modifier based on acrylate polymer compounds; (6) antioxidants based on alkyl sulfides, aromatic sulfides, aromatic amines hindered phenols etc.; (7) metallic soaps. The additives may also include the following: detergents, pour point depressants, viscosity index improvers, extreme pressure additives etc.

It is appreciated, however, that a variety of alternative thixotropic liquids may be used without departing from the spirit or scope of the present invention. For instance, it has been found that thixotropic liquids exhibiting a viscosity ranging from about 140 cP (centipoise) to about 1800 cP at 40° C. are particularly well suited to respond to the application and removal of compressive force, F, in the above-described manner and enable reliable readings to be acquired from the force-sensitive resistor 10.

Referring now again to FIGS. 2-4, to enable the force-sensitive resistor 10 to maintain pressure equilibrium while transitioning between the compressed and non-compressed configuration and permit air (or, alternatively a thixotropic liquid 50, as further described below with reference to FIGS. 5 and 6) out of and into the sensing chamber 15, the spacer 40 defines a vent 42. In this exemplary embodiment, the vent 42 is located proximate to a channel 25 defined by the first layer 20 and the second layer 30. Specifically, in this embodiment, the channel 25 is defined by the first substrate 21 and the second substrate 31. As such, when the force-sensitive resistor 10 is compressed, air, a, is directed from the sensing chamber 15, through the vent 42, and into the channel 25. Conversely, when the compressive force, F, is removed from force-sensitive resistor 10 and the resiliency of the first substrate 21 and/or the second substrate 31 returns the force-sensitive resistor 10 to the non-compressed configuration, air, a, is drawn from the channel 25, through the vent 42, and into the sensing chamber 15. By virtue of the sensing chamber 15 and the channel 25 being in fluid communication with each other, air, a, within the sensing chamber 15 can be readily displaced in response to the application of a compressive force, F, thereby reducing the risk of the force-sensitive resistor 10 rupturing during operation, as is problematic in force-sensitive resistors with sealed sensing chambers.

Referring still to FIGS. 2-4, in this exemplary embodiment, the first electrode 32a and the second electrode 32b of the lower conductive element 32 extend out of the sensing chamber 15 and into the channel 25 defined by the first layer 20 and the second layer 30. As the portion of the first electrode 32a and the second electrode 32b within the channel 25 do not come into contact with the upper conductive element 22 during normal operation of the force-sensitive resistor 10, those portions can be permanently covered to prevent moisture damage. In this regard, and in this embodiment, the portions of the first electrode 32a and the second electrode 32b positioned within the channel 25 are covered by a protective ink layer 34.

Figure 5:
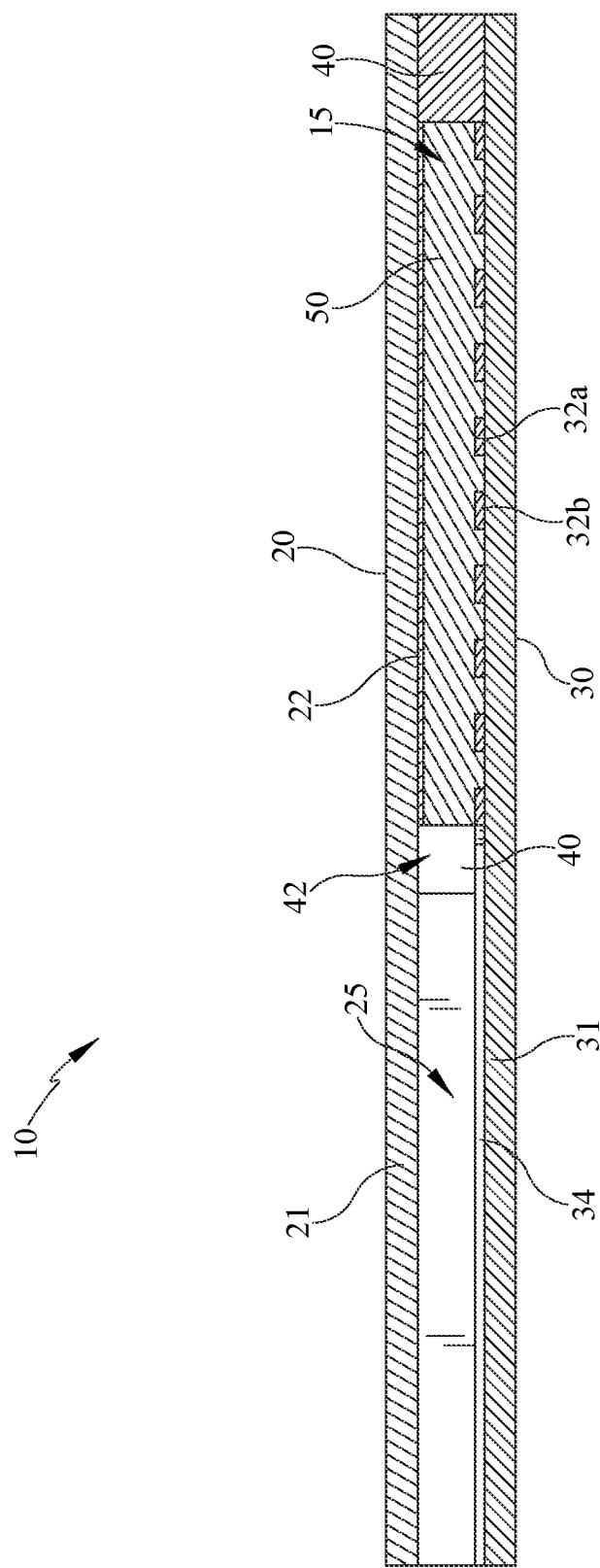
FIG. 5 is a sectional view of another exemplary force-sensitive resistor made in accordance with the present invention.
Figure 6:
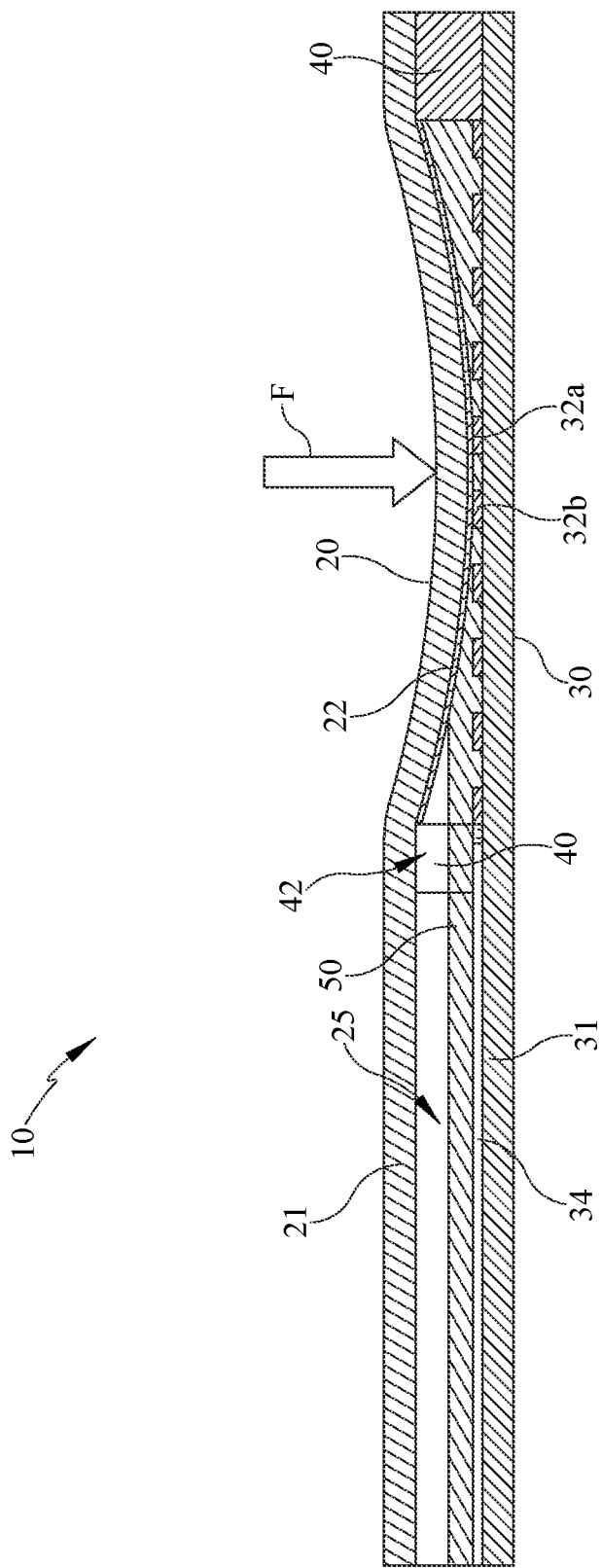
FIG. 6 is another sectional view of the exemplary force-sensitive resistor of FIG. 5 similar to FIG. 5, but with a compressive force applied and the force-sensitive resistor in a compressed configuration.

FIGS. 5 and 6 each show a sectional side view of another exemplary force-sensitive resistor 100 made in accordance with the present invention. As shown in FIGS. 5 and 6, the force-sensitive resistor 100 in this embodiment includes each of the structural components of and provides the same general functionality as the force-sensitive resistor 10 described above with reference to FIGS. 1-4. In this regard, like components are provided with like reference numerals throughout the present application. Unlike the force-sensitive resistor 10 described above with reference to FIGS. 1-4, however, in this embodiment, the volume of thixotropic liquid 50 within the sensing chamber 15 is sufficient as to coat both the upper conductive element 22 and the lower conductive element 32 of the force-sensitive resistor 100. Specifically, in this embodiment, the entire volume defined by the sensing chamber 15 is filled with thixotropic liquid 50 when the force-sensitive resistor 10 is in the non-compressed configuration and the thixotropic liquid 50 is in the initial state, as shown in FIG. 5.

As evidenced by viewing FIGS. 5 and 6 in sequence, in this embodiment, the open circuit defined by the first electrode 32a and the second electrode 32b of the lower conductive element 32 is also completed by virtue of moving the conductive force-sensing ink of the upper conductive element 22 into contact with the printed first electrode 32a and second electrode 32b of the lower conductive element 32. However, due to the increased volume of thixotropic liquid 50 within the sensing chamber 15, as a compressive force, F, is applied to the first layer 20 and/or the second layer 30, at least a portion of the thixotropic liquid 50 is expelled from the sensing chamber 15. In this regard, when a compressive force, F, is applied to the force-sensitive resistor 100, the thixotropic liquid 50 is displaced, at least in part, by virtue of a portion of the thixotropic liquid 50 being expelled from the sensing chamber 15, through the vent 42 defined by the spacer 40, and into the channel 25 defined by the first layer 20 and the second layer 30. Conversely, as the compressive force, F, is removed, the resiliency of the first substrate 21 and/or the second substrate 31 return the force-sensitive resistor 100 to the non-compressed configuration and the previously expelled thixotropic liquid 50 returns into the sensing chamber 15 and resumes its initial (non-displaced) state filling the volume of the sensing chamber 15 and coating both the upper conductive element 22 and the lower conductive element 32.

Referring still to FIGS. 5 and 6, due to the increased volume of thixotropic liquid 50, the opportunity for air, and thus moisture carried therewith, to be drawn through the vent 42 as the force-sensitive resistor 100 transitions from the compressed configuration to the non-compressed configuration is significantly decreased. Further, because the thixotropic liquid 50 fills the entire volume of the sensing chamber 15 when in the initial state, there is thus little, if any room, for moisture within the sensing chamber 15 when the force-sensitive resistor 100 is in the non-compressed configuration. In this way, the force-sensitive resistor 100 in this embodiment may prove particularly useful in applications in which the force-sensitive resistor 100 is intended to be implemented in environments or conditions with very high moisture levels and maximum protection against moisture ingress is needed.

Referring now to FIGS. 1-6, the lower conductive element 32 of the force-sensitive resistor 10 of FIGS. 1-4 and both the upper conductive element 22 and the lower conductive element 32 of the force-sensitive resistor 100 of FIGS. 5 and 6 can be coated with the thixotropic liquid 50 using a variety of application methods, including screen printing, inkjet printing, vapor deposition, and dispensing. Depending on the composition of the thixotropic liquid 50, the desired thickness of the thixotropic liquid 50, and/or intended application of the electronic device, one application method may, however, prove more suitable or convenient. For example, in instances where only a single conductive element is to be coated, such as the lower conductive element 32 of the force-sensitive resistor 10 described above with reference to FIGS. 1-4, the thixotropic liquid 50 may be deposited directly onto the second layer 30 via screen or inkjet printing to cover the exposed surfaces of the lower conductive element 32 prior to assembly of the respective components of the force-sensitive resistor 10. In other instances, where both conductive elements are to be coated, such as with the force-sensitive resistor 100 described above with reference to FIGS. 5 and 6, the thixotropic liquid 50 may be injected into the sensing chamber 15.

Although discussed herein in the context of the force-sensitive resistors 10, 100 described above with reference to FIGS. 1-6 for brevity, it is appreciated that the thixotropic liquid 50 may be similarly implemented in other flexible electronic devices to reduce moisture-based damage or interference. In this regard, the present invention is thus further directed to a method for reducing moisture-based damage or interference within a flexible electronic device, which includes coating one or more conductive elements of the flexible electronic device with the thixotropic liquid 50. In this regard, the thixotropic liquid 50 utilized within such method may be applied in the same manner and retain the same compositional features, thickness, and viscosity characteristics as that described above with reference to the force-sensitive resistors 10, 100.

The presently-disclosed subject matter is further illustrated by the following specific, but non-limiting, examples. The following examples may include compilations of data that are representative of data gathered at various times during the course of development and experimentation related to the present invention.

EXAMPLES

The experimental procedure for providing evidence of the innovation is described below. The force sensors with and without coating were connected to devices that can harvest data from the sensor and the contacts were made watertight via either plastic, the ventilation point of the plastic housing was protected by an expanded PTFE membrane. The device can provide a digital output and in the test 16 bits digital signal was used. Thus, ranges from 0 to 65536 for zero to full load capacity of the sensor. In the examples and comparative examples provided below the digital output was provided indicating the signal output according to different loading and environmental conditions. The sensors were first tested using the device that provides a reference point. Then the sensors were subjected to different loading and environmental conditions (represented using digital output in the same manner of the sensor digital output). The sensors were tested repeatedly for a number of cycles. Then the sensors were tested again using the same conditions as during the first step. The result data were presented in Table 1 and Table 2. Table 1 shows the effect with cyclic loading at different load levels, and Table 2 shows the effect of water presence.

Example 1. With the structure as shown in FIGS. 1-4, a force sensor was constructed with screen printed thixotropic liquid 1, with 300.5 cSt viscosity (40° C.) and 0.99 g/cm$^3$ density, according to the descriptions provided herein. The screen-printed thixotropic layer, corresponding to reference numeral 50 in the drawings. The coating covers partially the high conductivity electrodes, corresponding to reference numerals 32a and 32b in the drawings. The spacer, corresponding to reference numeral 40 in the drawings, was of thickness of 0.2 mm.

Example 2. This is the same as Example 1, apart from the fact that it was tested under a different load.

Example 3. This is the same as Example 1, apart from the fact that under the same load the signal output was slightly higher than that of Example 1.

Example 4. This is the same as Example 2, apart from the fact that under the same load the signal output was slightly lower than that of Example 1.

Example 5. This is a different force sensor of the same structure as Example 1, apart from 0.125 mm thickness of the spacer, and the use of thixotropic liquid 2, with 140 cPs viscosity at 20° C. and 0.94 g/cm$^3$ density, that was applied using a dispensing device.

Example 6. This is the same as Example 5, apart from the fact that under the same load the signal output was slightly lower.

Example 7. This is the same as Example 6, apart from the fact that a different coating thixotropic liquid was used and the thixotropic liquid used to fill up the entire air gap volume of inside the sensor. The sensor maintain its force sensing function and it was shown in Table 3 the average and the variation of multiple incidences of 6.3% standard deviation.

Comparative example 1. This is the same structure as Example 1, apart from the fact that there was not any thixotropic liquid coating applied, the sensor material used were different.

Comparative example 2. This is the same as Example 6, apart from the fact that there was not any thixotropic liquid coating applied.

Comparative example 3. This is the same as Comparative example 2, apart from the fact that the load level was different during the cyclic testing.

Comparative example 4. This is the same as Comparative example 3, apart from the fact that the load level was different during the cyclic testing.

Comparative example 5. This is the same as Comparative example 4, apart from the fact that the load level was different during the cyclic testing.

Comparative example 6. This is the same as Comparative example 5, apart from the fact that the highly conductive electrode material used in the sensor was different.

Comparative example 7. This is the same as Comparative example 6, apart from the fact that the cyclic testing was carried out with frequent water contact to sensor and the protected contact housing.

Comparative example 8. This is the same as Comparative example 1, apart from the fact that the cyclic testing was carried out with frequent water contact to sensor and the protected contact housing.

Comparative example 9. This is the same as Comparative example 5, apart from the fact that the cyclic testing was carried out with frequent water contact to sensor and the protected contact housing.

Comparative example 10. This is the same as Comparative example 9, apart from the fact that the load level was different during the cyclic testing.

TABLE 1

Examples and comparative examples: Digital output before and after cyclic loading under different conditions.

|  | Pre | Post cyclic loading | Cycle and load |
| --- | --- | --- | --- |
| Example 1 | 37547 | 38742 | 144,000 @ 48888 |
| Example 2 | 37143 | 37693 | 144,000 @ 5441 |
| Comparative example 1 | 28723 | 5666 | 144,000 @ 38728 |
| Comparative example 2 | 38338 | 29039 | 144,000 @ 48888 |
| Comparative example 3 | 38475 | 5247 | 144,000 @ 44272 |
| Comparative example 4 | 38392 | 15255 | 144,000 @ 38728 |
| Comparative example 5 | 38729 | 17924 | 144,000 @ 44272 |
| Comparative example 6 | 41899 | 45065 | 144,000 @ 5441 |

Example 1 and Example 2 were tested using different load levels for the cyclic loading. They were tested at a maximum level of 49,000 and 5,500 respectively and 144,000 cycles for each of the examples. When tested prior and post to the cyclic loading with the same reference load, they both return near identical output (3.2% and 1.0% change respectively). There was not any degradation of the sensor, or at least not significant.

A few comparative examples demonstrated at different cyclic loading levels, as well as difference in sensor construction or material. The number of cycles tested were 144,000.

One comparative example, Comparative example 1, when tested at cyclic load maximum level of 40,000, the prior and post to the cyclic loading results shown a massive degradation in sensor output, down from 28,723 to 5,666 (down to below 20% of the output level).

Another comparative example, Comparative example 2, when tested at cyclic load maximum level of 49,000, the prior and post to the cyclic loading results shown a massive degradation in sensor output, down from 38,338 to 29,039 (down to 75.7% of the output level).

Another comparative example, Comparative example 3, when tested at cyclic load maximum level of 45,000, the prior and post to the cyclic loading results shown a massive degradation in sensor output, down from 38,475 to 5,247 (down to below 15% of the output level).

Another comparative example, Comparative example 4, when tested at cyclic load maximum level of 39,000, the prior and post to the cyclic loading results shown a massive degradation in sensor output, down from 38,392 to 15,255 (down to below 40% of the output level).

Another comparative example, Comparative example 5, when tested at cyclic load maximum level of 45,000, the prior and post to the cyclic loading results shown a massive degradation in sensor output, down from 38,729 to 17,924 (down to 46.3% of the output level).

Another comparative example, Comparative example 6, when tested at cyclic load maximum level of 5,500, the prior and post to the cyclic loading results shown a slight increase in sensor output, up from 41,899 to 45,065 (up to 107.6% of the output level).

TABLE 2

Examples and comparative examples: Digital output before
and after cyclic loading under different conditions.

|  | Prior | Number of cycles and load level | Post cyclic loading with water |
|---|---|---|---|
| Example 3 | 38211 | 2400 @ 15353 | 39029 |
| Example 4 | 37639 | 16,200 @ 48912 | 38579 |
| Example 5 | 31790 | 2400 @ 42472 | 31462 |
| Example 6 | 30845 | 2400 @ 35468 | 29684 |
| Comparative example 7 | 45493 | 144,000 @ 48888 | 57505 |
| Comparative example 8 | 31076 | 16,200 @ 48912 | 24848 |
| Comparative example 9 | 39824 | 144,000 @ 38728 | 46129 |
| Comparative example 10 | 36370 | 144,000 @ 5441 | 46696 |

A set of experiments were carried out with present of water in frequent and direct contact with the sensor and its venting area. As demonstrated in Example 3, when cyclic tested at load maximum level of 16,000, 2,400 cycles, the prior and post to the cyclic loading results shown a near identical sensor output (slight increase of 2.1% of the output level).

Another example, Example 4, when tested at cyclic load maximum level of 49,000, 16,200 cycles, the prior and post to the cyclic loading results shown a near identical output (slight increase of 2.5% of the output level).

Another example, Example 5, when tested at cyclic load maximum level of 43,000, 2,400 cycles, the prior and post to the cyclic loading results shown a near identical output (slight decrease of 1.1% of the output level).

Another example, Example 6, when tested at cyclic load maximum level of 36,000, 2,400 cycles, the prior and post to the cyclic loading results shown a near identical output (slight decrease of 3.8% of the output level).

As shown above, the coated examples shown no water ingress resulted short circuit or adverse degradation due to water damage. A set of comparative examples were tested at different maximum load levels, as well as different sensors.

One comparative example, Comparative example 7, when tested at cyclic load maximum level of 49,000, 144,000 cycles, the prior and post to the cyclic loading results shown some massive increase of output (increase to 126.4% of the output level).

Another comparative example, Comparative example 8, when tested at cyclic load maximum level of 49,000, 16,200 cycles, the prior and post to the cyclic loading results shown significant degradation of output (decrease to 80.0% of the output level).

Another comparative example, Comparative example 9, when tested at cyclic load maximum level of 39,000, 144,000 cycles, the prior and post to the cyclic loading results shown some massive increase of output (increase to 115.8% of the output level).

Another comparative example, Comparative example 10, when tested at cyclic load maximum level of 5,500, 144,000 cycles, the prior and post to the cyclic loading results shown some massive increase of output (increase to 128.4% of the output level).

The increase in sensor output levels post to the cyclic loading was caused by water ingress.

TABLE 3

Example 7: Digital output during loading
with average and standard deviation.

|  | Average | Standard deviation |
|---|---|---|
| Example 7 | 34865 | 6.3% |

Example 7 shows that with multiple sensors tested with the filled liquid, the sensor function was normal or not significantly affected.

One of ordinary skill in the art will recognize that additional embodiments and implementations are also possible without departing from the teachings of the present invention. This detailed description, and particularly the specific details of the exemplary embodiments and implementations disclosed therein, is given primarily for clarity of understanding, and no unnecessary limitations are to be understood therefrom, for modifications will become obvious to those skilled in the art upon reading this disclosure and may be made without departing from the spirit or scope of the invention.

What is claimed is:

1. A method for reducing moisture-based damage or interference within an electronic device, the method comprising:
    coating at least one conductive element of the electronic device with an electrically non-conductive thixotropic liquid;
    wherein the electronic device includes a vent that is in fluid communication with a channel defined by a first layer and a second layer of the electronic device.

2. The method as recited in claim 1, wherein the thixotropic liquid includes a thixotropic liquid exhibiting a viscosity ranging from about 140 cP to about 1800 cP at 40° C.

3. The method as recited in claim 1, wherein coating at least one conductive element of the electronic device includes coating the thixotropic liquid to exhibit a thickness ranging from about 10 nm to about 500 μm.

4. The method as recited in claim 1, wherein coating at least one conductive element of the electronic device includes coating the thixotropic liquid to exhibit a thickness ranging from about 100 nm to about 10 μm.

5. The method as recited in claim 1, wherein coating at least one conductive element of the electronic device includes coating only a single conductive element of the electronic device with thixotropic liquid.

6. The method as recited in claim 1, wherein coating at least one conductive element of the electronic device includes coating two opposing conductive elements of the electronic device with thixotropic liquid.

7. The method as recited in claim 1, wherein coating of the at least one conductive element of the electronic device is performed via screen printing.

8. The method as recited in claim 1, wherein coating of the at least one conductive element of the electronic device is performed via inkjet printing.

9. The method as recited in claim 1, wherein coating of the at least one conductive element of the electronic device is performed via vapor deposition.

10. The method as recited in claim 1, wherein the thixotropic liquid is water repellent.

11. An electronic device comprising:
    a first layer including an upper conductive element;
    a second layer including a lower conductive element facing the upper conductive element;

a spacer positioned between the first layer and the second layer, with the first layer, the second layer, and the spacer collectively defining a sensing chamber;

an electrically non-conductive thixotropic liquid within the sensing chamber; and a vent in fluid communication with a channel defined by the first layer and the second layer;

wherein, in use, the first layer and the second layer are configured to move toward and away from each other within the sensing chamber to vary the resistance of the electronic device, and wherein movement of the first layer and the second layer toward each other displaces the thixotropic liquid from an initial state coating at least one of the upper conductive element and the lower conductive element to permit contact between the upper conductive element and the lower conductive element, and movement of the first layer and the second layer away from each other returns the thixotropic liquid to the initial state.

12. The electronic device as recited in claim 11, wherein the vent is defined by the spacer.

13. The electronic device as recited in claim 11, wherein the thixotropic liquid fills a volume defined by the sensing chamber.

14. The electronic device as recited in claim 10, wherein the thixotropic liquid includes a thixotropic liquid exhibiting a viscosity ranging from about 140 cP to about 1800 cP at 40° C.

15. The electronic device as recited in claim 10, wherein the thixotropic liquid has a thickness ranging from about 10 nm to about 500 μm when in the initial state.

16. The electronic device as recited in claim 10, wherein the thixotropic liquid has a thickness ranging from about 100 nm to about 11 μm when in the initial state.

17. The electronic device as recited in claim 10, wherein the lower conductive element includes a first electrode and a second electrode spaced apart from the first electrode.

18. The electronic device as recited in claim 17, wherein the upper conductive element is comprised of a force-sensing ink.

19. The electronic device as recited in claim 10, wherein the thixotropic liquid is water repellent.

20. An electronic device comprising:
a first layer including an upper conductive element;
a second layer including a lower conductive element facing the upper conductive element;
a spacer positioned between the first layer and the second layer, with the first layer, the second layer, and the spacer collectively defining a sensing chamber;
an electrically non-conductive thixotropic liquid within the sensing chamber; and
wherein, in use, the first layer and the second layer are configured to move toward and away from each other within the sensing chamber to vary the resistance of the electronic device,
wherein movement of the first layer and the second layer toward each other displaces the thixotropic liquid from an initial state coating at least one of the upper conductive element and the lower conductive element to permit contact between the upper conductive element and the lower conductive element, and movement of the first layer and the second layer away from each other returns the thixotropic liquid to the initial state, and
wherein at least a portion of the thixotropic liquid is expelled through the vent as the first layer and the second layer are moved toward each other.

21. The electronic device as recited in claim 20, wherein the thixotropic liquid is water repellent.

* * * * *

UNITED STATES PATENT AND TRADEMARK OFFICE
CERTIFICATE OF CORRECTION

PATENT NO. : 11,361,885 B2
APPLICATION NO. : 17/144649
DATED : June 14, 2022
INVENTOR(S) : Marsh et al.

It is certified that error appears in the above-identified patent and that said Letters Patent is hereby corrected as shown below:

In the Claims

Claim 16, Column 15, Line 34, delete "nm to about 11" and insert --nm to about 10--

Signed and Sealed this
Twelfth Day of July, 2022

Katherine Kelly Vidal
*Director of the United States Patent and Trademark Office*